United States Patent [19]

Szafraniec et al.

[11] Patent Number: 5,289,258
[45] Date of Patent: Feb. 22, 1994

[54] FIBER OPTIC GYROSCOPE MODULATION ERROR REDUCTION

[75] Inventors: Bogdan Szafraniec, Cave Creek; Richard H. Frische, Phoenix; Richard J. August, Scottsdale; Kevin B. Dimond, Phoenix; Dick Ang, Glendale; James N. Blake; John R. Feth, both of Phoenix, all of Ariz.

[73] Assignee: Honeywell Inc., Minneapolis, Minn.

[21] Appl. No.: 821,030

[22] Filed: Jan. 15, 1992

[51] Int. Cl.⁵ .............................................. G01C 19/72
[52] U.S. Cl. ........................................ 356/350; 385/3; 359/279
[58] Field of Search ............... 356/350; 372/94; 385/3; 359/278, 279

[56] References Cited

U.S. PATENT DOCUMENTS

| | | | |
|---|---|---|---|
| 4,637,722 | 1/1987 | Kim | 356/350 |
| 4,796,993 | 1/1989 | Sonobe et al. | 356/350 |

FOREIGN PATENT DOCUMENTS

| | | | |
|---|---|---|---|
| 9200502 | 1/1992 | European Pat. Off. | |
| 0480442 | 4/1992 | European Pat. Off. | 356/350 |
| 2221999 | 2/1990 | United Kingdom | 359/279 |

OTHER PUBLICATIONS

"All-single-mode Fiber-optic Gyroscope," R. Bergh et al, *Optics Letters*, vol. 6(4), 1981, pp. 198–200.

"All-single-mode Fiber-optic Gyroscope with Long-term Stability," R. Bergh et al *Optics Letters*, vol. 6(10), 1981, pp. 502–505.

"Response of Fiber Gyros to Signals Introduced at the Second Harmonic of the Bias Modulation Frequency," B. Y. Kim et al, *Single-Mode Optical Fibers*, Proceedings of SPIE, vol. 425, 1983, pp. 86–89.

"An Overview of Fiber-Optic Gyroscopes," R. Bergh et al, *Journal of Lightwave Technology*, vol. LT-2(2), 1984, pp. 91–107.

"Impact of Modulation Induced Signal Instabilities on Fiber Gyro Performances," by E. Kiesel, *Fiber Optic and Laser Sensor V*, Proceedings of SPIE, vol. 838, 1987, 129–139.

"Drift Reduction in Optical Fiber Gyroscopes," S. L. A. Carrara, Doctoral Dissertation, Stanford University Department of Electrical Engineering, Nov. 1988, pp. 142–145.

"Drift Caused by Phase Modulator Non-Linearities in Fiber Gyroscopes," S. L. S. Carrara, SPIE vol. 1267, Fiber Optic Sensors IV (1990), pp. 187–191.

*Primary Examiner*—Samuel A. Turner
*Attorney, Agent, or Firm*—Mark J. Gebhardt

[57] ABSTRACT

An error control arrangement for an optical fiber rotation sensor having electromagnetic waves propagating in opposite directions passing through a bias optical phase modulator operated by a phase modulation generator both of which can contribute second harmonic distortion resulting in errors in the sensor output signal which are controlled. Control of the bias optical phase modulator contribution for a modulator having a piezoelectric body wrapped with an optical fiber portion is accomplished by mounting the body utilizing layers having nonlinear stiffness.

34 Claims, 2 Drawing Sheets

FIBER OPTIC GYROSCOPE MODULATION ERROR REDUCTION

BACKGROUND OF THE INVENTION

The present invention concerns fiber optic system phase modulators and, more particularly, arrangements for accommodating such phase modulation of electromagnetic waves traveling therein in changing conditions.

Fiber optic gyroscopes are an attractive means with which to sense rotation of an object supporting such a gyroscope. Such gyroscopes can be made quite small and can be constructed to withstand considerable mechanical shock, temperature change, and other environmental extremes. Due to the absence of moving parts, they can be nearly maintenance free, and they have the potential of becoming economical in cost. They can also be sensitive to low rotation rates that can be a problem in other kinds of optical gyroscopes.

A fiber optic gyroscope has a coiled optical fiber wound on a core and about the axis thereof around which rotation is to be sensed. The optical fiber is typical of a length of 100 to 2,000 meters, or so, and is part of a closed optical path in which an electromagnetic wave, or light wave, is introduced and split into a pair of such waves to propagate in opposite directions through the coil to both ultimately impinge on a photodetector. Rotation about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e. the well-known Sagnac effect. The use of a coiled optical fiber is desirable because the amount of phase difference shift due to rotation, and so the output signal, depends on the length of the entire optical path through the coil traversed by the two electromagnetic waves travelling in opposed direction, and so a large phase difference can be obtained in the long optical fiber but in the relatively small volume taken by it as a result of being coiled.

The output current from the photodetector system photodiode, in response to the opposite direction traveling electromagnetic waves impinging thereon after passing through the coiled optical fiber, follows a raised cosine function. That is, the output current depends on the cosine of the phase difference between these two waves. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two opposite direction traveling electromagnetic waves is usually modulated by placing an optical phase modulator, or what is sometimes referred to as a bias modulator, in the optical path on one side of the coiled optical fiber. As a result, one of these opposite direction propagating waves passes through the modulator on the way into the coil while the other wave, traversing the coil in the opposite direction, passes through the modulator upon exiting the coil.

In addition, a phase-sensitive detector serving as part of a demodulator system is provided to receive a signal representing the photodetector output current. Both the phase modulator and the phase-sensitive detector can be operated by a sinusoidal signal generator at the so-called "proper" frequency to reduce or eliminate modulator induced amplitude modulation, but other waveform types of the same fundamental frequency can be used. Other frequencies can be used, and often are, to reduce the frequency to a more manageable value.

The resulting signal output of the phase-sensitive detector follows a sine function, i.e. the output signal depends on the sine of the phase difference between the two electromagnetic waves impinging on the photodiode, primarily the phase shift due to rotation about the axis of the coil in the absence of occurrence of other significant but unwanted phase shifts. A sine function is an odd function having its maximum rate of change at zero phase shift, and so changes algebraic sine on either side of zero phase shift. Hence, the phase-sensitive detector signal can provide an indication of which direction a rotation is occurring about the axis of the coil, and can provide the maximum rate of change of signal value as a function of the rotation rate near a zero rotation rate, i.e. the detector has its maximum sensitivity for phase shifts near zero so that its output signal is quite sensitive to low rotation rates. This is possible, of course, only if phase shifts due to other sources, that is, errors, are sufficiently small. In addition, this output signal in these circumstances is very close to being linear at relatively low rotation rates. Such characteristics for the output signal of the phase-sensitive detector are a substantial improvement over the characteristics of the output current of the photodetector without optical phase modulation.

Figure 1:
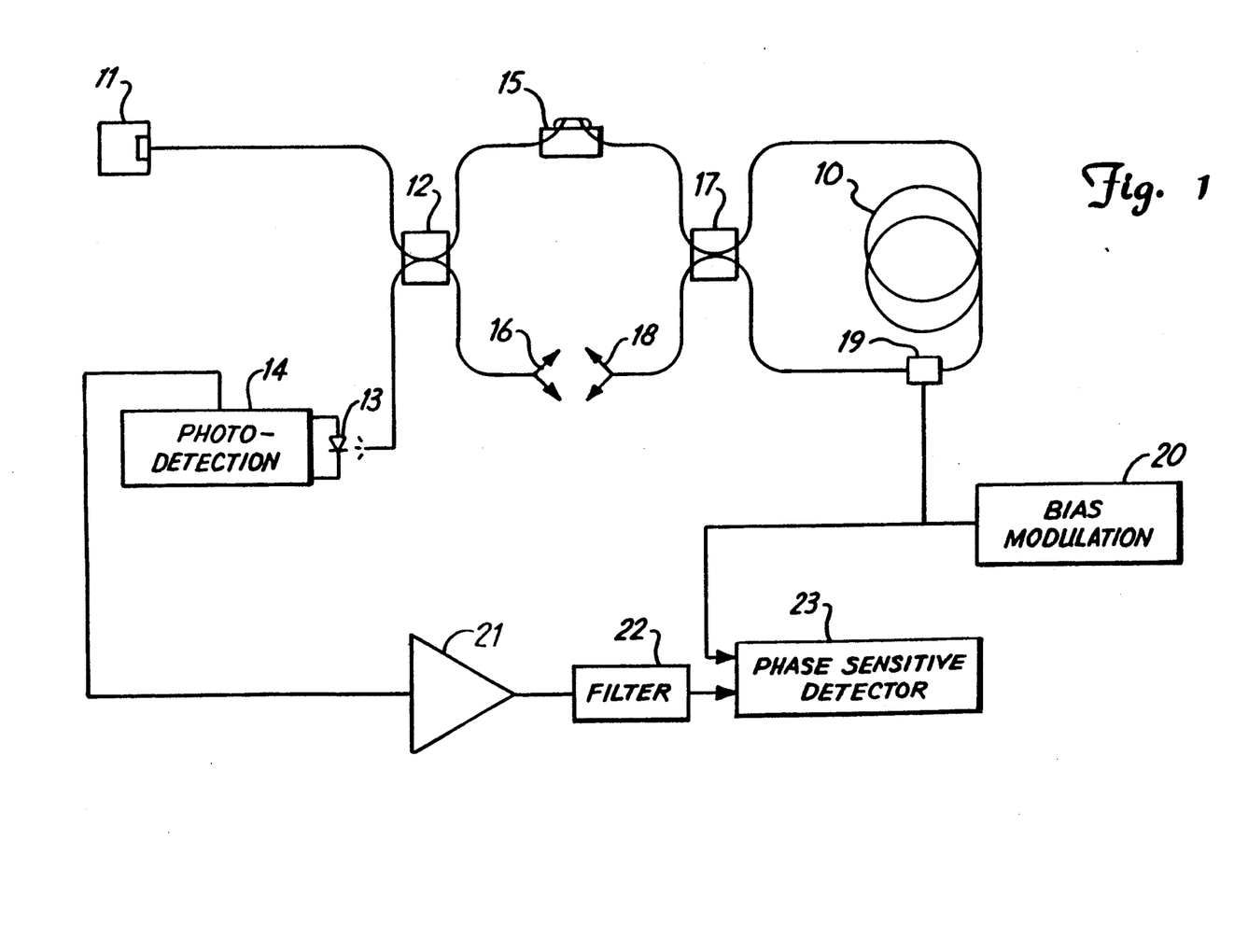
FIG. 1 shows a system schematic diagram of the present invention combining a signal processing arrangement and an optical transmission path and device arrangement.

An example of such a system from the prior art is shown in FIG. 1. The optical portion of the system contains several features along the optical paths to assure that this system is reciprocal, i.e. that substantially identical optical paths occur for each of the opposite direction propagating electromagnetic waves except for the specific introductions of non-reciprocal phase difference shifts, as will be described below. The coiled optical fiber forms a coil, 10, about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e. the slower propagation axis, or the low index axis is chosen for propagating the electromagnetic waves depending on the other optical components in the system. In the present system, the slow axis has been chosen in view of the optical components used therein.

The electromagnetic waves which propagate in opposite directions through coil 10 are provided from an electromagnetic wave source, or light source, 11, in FIG. 1. This source is typically a laser diode which provides electromagnetic waves, typically int he near-infrared part of the spectrum, with a typical wavelength of 830 nm. Source 11 must have a short coherence length for emitted light to reduce the phase shift difference errors between these waves due to Rayleigh and Fresnel scattering at scattering sites in coil 10. Because of the nonlinear Kerr effect in coil 10, different intensities in the two counter propagating waves can lead to different phase shifts therebetween. This situation can be overcome also by use of a short coherence length source for source 11 which leads to modal phase shift canceling.

Between laser diode 11 and fiber optic coil 10 there is shown an optical path arrangement in FIG. 1 formed by the extension of the ends of the optical fiber forming coil 10 to some optical coupling components which separate the overall optical path into several optical path portions. A portion of polarization-maintaining optical fiber is positioned against laser diode 11 at a point of optimum light emission therefrom, a point from which it extends to a first optical directional coupler, 12.

Optical directional coupler 12 has light transmission media therein which extend between four ports, two on each end of that media, and which are shown on each end of coupler 12 in FIG. 1. One of these ports has the optical fiber extending from laser diode 11 positioned thereagainst. At the other port on the sense end of the optical directional coupler 12 there is shown a further optical fiber positioned thereagainst which extends to be positioned against a photodiode, 13, which is electrically connected to a photodetection system, 14.

Photodiode 13 detects electromagnetic waves, or light waves, impinging thereon from the portion of the optical fiber positioned thereagainst and provides a photo current in response. This photocurrent, as indicated above, in the case of two nearly coherent light waves impinging thereon, follows a cosine function in providing a photocurrent output which depends on the cosine of the phase difference between such a pair of substantially coherent light waves. This photovoltaic device will operate into a very low impedance to provide the photo current which is a linear function of the impinging radiation, and may typically be a p-i-n photodiode.

Optical directional coupler 12 has another optical fiber against a port at the other end thereof which extends to a polarizer, 15. At the other port on that same side of coupler 12 there is a non-reflective termination arrangement, 16, involving another portion of an optical fiber.

Optical directional coupler 12, in receiving electromagnetic waves, or light, at any port thereof, transmits such light so that approximately half thereof appears at each of the two ports of coupler 12 on the end thereof opposite that end having the incoming port. On the other hand, no such waves or light is transmitted to the port which is on the same end of coupler 12 as is the incoming light port.

Polarizer 15 is used because, even in a single spatial mode fiber, two polarization modes are possible in electromagnetic waves passing through the fiber. Thus, polarizer 15 is provided for the purpose of passing one of these polarization modes through the optical fiber, along the slow axis thereof as indicated above, while blocking the other. Polarizer 15, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which the polarizer is placed. In this regard, the high birefringence in the optical fiber used again aids in reducing this resulting phase difference, as indicated above.

Polarizer 15 has a port on either end thereof with the electromagnetic wave transmission medium contained therein positioned therebetween. Positioned against the port on the end thereof opposite that connected to optical directional coupler 12 is another optical fiber portion which extends to a further optical bidirectional coupler, 17, which has the same wave transmission properties as does coupler 12.

The port on the same end of coupler 17 from which a port is coupled to polarizer 15 again is connected to a non-reflective termination arrangement, 18, using a further optical fiber portion. Considering the ports on the other end of coupler 17, one is connected to further optical components in the optical path portions extending thereto from one end of the optical fiber in coil 10. The other port in coupler 17 is directly coupled to the remaining end of optical fiber 10. Between coil 10 and coupler 17, on the side of coil 10 opposite the directly connected side thereof, is provided an optical phase modulator, 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in electromagnetic waves transmitted therethrough by changing the index of refraction of the transmission medium, or transmission media, therein to thereby change the optical path length. Such electrical signals are supplied to modulator 19 by a bias modulation signal generator, 20, providing a sinusoidal voltage output signal at a modulation frequency $f_g$ that is intended to be equal to $C_1 \sin(\omega_g t)$ where $\omega_g$ is the radian frequency equivalent of the modulation frequency $f_g$. Other suitable periodic waveforms could alternatively be used.

This completes the description of the optical portion of the system of FIG. 1 formed along the optical path followed by the electromagnetic waves, or light waves, emitted by source 11. Such electromagnetic waves are coupled from that source through the optical fiber portion to optical directional coupler 12. Some of such wave entering coupler 12 from source 11 is lost in non-reflecting terminating arrangement 16 coupled to a port on the opposite end thereof, but the rest of that wave is transmitted through polarizer 15 to optical directional coupler 17.

Coupler 17 serves as a beam-splitting apparatus in which electromagnetic waves entering the port thereof, received from polarizer 15, split approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning wave is lost in non-reflective arrangement 18 connected to the other port on the polarizer 15 connection end of coupler 17, but the rest of that wave passes through the other port of coupler 17 to polarizer 15 and to coupler 12 where a portion of it is transmitted to photodiode 13. The other part of the wave passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13.

As indicated above, photodiode 13 provides an output photocurrent, $i_{PD13}$, proportional to the intensity of the two electromagnetic waves or light waves impinging thereon, and is therefore expected to follow the cosine of the phase difference between these two waves impinging on that diode as given by the following equation:

$$i_{PD13} = \frac{I_o}{2} [1 + \cos(\phi_R + \phi_m \cos\omega_g t)]$$

This is because the current depends on the resulting optical intensity of the two substantially coherent waves incident on photodiode 13, an intensity which will vary from a peak value of $I_o$ to a smaller value depending on how much constructive or destructive interference occurs between the two waves. This interference of waves will change with rotation of the coiled optical fiber forming coil 10 about its axis as such rotation introduces a phase difference shift of $\phi_R$ between the waves. Further, there is an additional variable phase shift introduced in this photodiode output current by modulator 19 with an amplitude value of $\phi_m$ and which is intended to vary as $\cos(\omega_g t)$.

Optical phase modulator 19 is of the kind described above and is used in conjunction with a phase-sensitive detector as part of a demodulation system for converting the output signal of photodetection system 14, following a cosine function as indicated above, to a signal following a sine function. Following such a sine function provides in that output signal, as indicated above, information both as to the rate of rotation and the direction of that rotation about the axis of coil 10.

Thus, the output signal from photodetection system 14, including photodiode 13, is converted to a voltage and provided through an amplifier, 21, where it is amplified and passed through a filter, 22, to such a phase sensitive detector means, 23. Phase-sensitive detector 23, serving as part of a phase demodulation system, is a well known device. Such a phase-sensitive detector extracts the amplitude of the first harmonic of the filtered photodiode system output signal, or the fundamental frequency of modulation signal generator 20, to provide an indication of the relative phase of the electromagnetic waves impinging on photodiode 13. This information is provided by phase-sensitive detector 23 in an output signal following a sine function, that is, this output signal follows the sine of the phase difference between the two electromagnetic waves impinging on photodiode 13.

Bias modulator signal generator 20, in modulating the light in the optical path at the frequency $f_g$ described above, also leads to harmonic components being generated by the recombined electromagnetic waves in photodetection system 14. Filter 22 is a bandpass filter which is to pass the modulation frequency component of the output signal of photodetector 14, i.e. the first harmonic, after its amplification by amplifier 21.

In operation, the phase difference changes in the two opposite direction propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves. The amplitude scaling factor of the modulation frequency component of the output signal of photodetection system 14, appearing at the output of filter 22, is expected to be set by the sine of this phase difference modified further only by the factors of a) the amplitude value of the phase modulation of these waves due to modulator 19 and generator 20, and b) a constant representing the various gains through the system. Then, the periodic effects of this sinusoidal modulation due to generator 20 and modulator 19 in this signal component are expected to be removed by demodulation in the system containing phase-sensitive detector 23 leaving a demodulator system (detector) output signal depending on just the amplitude scaling factor thereof.

Thus, the voltage at the output of amplifier 21 will typically appear as:

$$V_{21-out} = k\{1 + \cos[\phi_R + \phi_m \cos(\omega_g t + \theta)]\}$$

The constant k represents the gains through the system to the output of amplifier 21. The symbol, $\theta$, represents additional phase delay in the output signal of amplifier 21 with respect to the phase of the signal provided by generator 20. Some of this phase shift will be introduced in photodetection system 14, and some will be due from other sources such as a phase shift across modulator 19 between the phase of the signals supplied by generator 20 and the response of modulator 19 in having the index of refraction of the media therein, and/or its length, correspondingly change. The other symbols used in the preceding equation have the same meaning as they did in the first equation above.

The foregoing equation can be expanded in a Bessel series expansion to give the following:

$$V_{21-out} = k[1 + J_o(\phi_m)\cos\phi_R] - 2kJ_1(\phi_m)\sin\phi_R\cos(\omega_g t + \theta) -$$

$$2kJ_2(\phi_m)\cos\phi_R\cos2(\omega_g t + \theta) + 2kJ_3(\phi_m)\sin\phi_R\cos3(\omega_g t + \theta) +$$

$$\sum_{n=2}^{\infty} [(-1)^n 2kJ_{2n}(\phi_m)\cos\phi_R\cos2n(\omega t + \theta) +$$

$$(-1)^n 2kJ_{2n+1}(\phi_m)\sin\phi_R\cos(2n + 1)(\omega_g t + \theta)]$$

This signal at the output of amplifier 21 is applied to the input of filter 22.

Filter 22, as indicated above, passes primarily the first harmonic from the last equation, i.e. the modulation frequency component. As a result, the output signal of filter 22 can be written as follows:

$$V_{22-out} = -2kJ_1(\phi_m)\sin\phi_R\cos(\omega_g t + \theta + \Psi_1)$$

The further phase delay term appearing, $\Psi_1$, is the additional phase shift in the first harmonic term added as a result of passing through filter 22. This added phase shift is expected to be substantially constant and a known characteristic of filter 22.

The signal from filter 22 is then applied to phase-sensitive detector 23, as is the signal from bias modulator generator 20, the latter again intended to be equal to $C_1 \sin(\omega_g t)$ where $\omega_g$ is the radian frequency equivalent of the modulation frequency $f_g$. Assuming that a phase shift equal to $\theta + \omega_1$ can be added by phase-sensitive detector 23 to its output signal, the output of that detector with such a generator 20 output signal will then be the following:

$$V_{23\text{-}out} = k' J_1(\phi_m) \sin\phi_R$$

The constant $k'$ accounts for the system gains through phase-sensitive detector 23.

However, these expected results may not be achieved in the system of FIG. 1. One reason for failing to achieve the expected results is that bias modulation signal generator 20, in modulating the light in the optical path at frequency $f_g$ as described above through phase modulator 19, not only results in harmonic components being generated in photodetection system 14 by the recombined electromagnetic waves, but also directly supplies some harmonic components in the varying optical path phase because of nonlinearities occurring both in generator 20 and modulator 19.

That is, as a first possibility, the output signal supplied by modulation generator 20 at its output may contain not only a fundamental signal at frequency $f_g$, but also significant harmonics thereof. Even if a signal free of such harmonics could be provided, nonlinear component characteristics and hysteresis in phase modulator 19 can result in introducing such harmonics into the varying phase provided thereby in the optical path. Such harmonics can lead to significant rate bias errors in the output signal of the fiber optic gyroscope. Thus, there is desired an interferometric fiber optic gyroscope in which such errors due to the modulation system are reduced or eliminated.

SUMMARY OF THE INVENTION

The present invention provides an error control arrangement for an optical fiber rotation sensor based on electromagnetic waves propagating in opposite directions in said coiled optical fiber to impinge on a photodetector with a phase relationship. These electromagnetic waves propagating in opposite directions both pass through a bias optical phase modulator operated by a phase modulation generator both of which can contribute second harmonic distortion resulting in errors in the sensor output signal. Direct limitation of both contributions to keep them less than the equivalent output error limitation, or indirect limitation by a limiting factor to keep the combination of the factor and the contributions less than the equivalent output error limitation can be used to provide an acceptable sensor. Control of the bias optical phase modulator contribution for a modulator having a piezoelectric body wrapped with an optical fiber portion is accomplished by mounting the body utilizing layers having nonlinear stiffness.

DETAILED DESCRIPTION OF THE PREFERRED EMBODIMENTS

Typically, just the next harmonic after the fundamental in the time varying phase imposed on the optical path to and from coil 10 by phase modulator 19 and modulation generator 20 of the bias modulation subsystem has an amplitude significant enough to cause significant errors. Hence, only the second harmonic need be considered. Thus, modulation signal generator can be considered, in the absence of measures being taken to eliminate same, to provide an output signal, particularly at higher output voltage amplitudes, that varies as:

$$V_{20} = C_2[\cos\omega_g t + \delta_e \cos(2\omega_g t + \Psi'_e)]$$

rather than as $C_1\sin(\omega_g t)$ where the change from a sine function representation to a cosine function representation is an arbitrary choice.

In this representation of the output signal of generator 20, $\delta_e$ is the relative amplitude of the unwanted second harmonic signal distorting the desired output, relative to the amplitude of the fundamental component, and $C_2$ is a general gain constant for generator 20 which is set at a value sufficient to provide the fundamental output signal component therefrom at a desired amplitude. The phase, $\Psi'_e$, developed in the generation of the second harmonic component, has been arbitrarily chosen relative to the zero phase value arbitrarily selected for the fundamental signal.

Phase modulator 19 may be a ceramic material body exhibiting piezoelectric effects, and have a portion of the optical fiber leading to coil 10 from loop coupler 17 wrapped in several turns therearound. This ceramic body is typically a truncated portion of a hollow cylinder (a ring) formed of a material such as lead zirconate titanate (PZT), and the electrical leads interconnecting this ring and leading to interconnections with generator 20 are typically placed one each on the outside and the inside curved surfaces of the truncated cylindrical body. Under electrical energization, the ring exhibits behavior as an electrical circuit component which can be simulated at least in part by equivalent electrical circuit components. The fundamental signal from modulation generator 20 causes the ceramic ring to expand and contract radially, thereby increasing and contracting the perimeter of the ring outer curved surface, and so stretching, and relaxing from such stretches, the optical fiber wrapped therearound effectively increasing and decreasing its length. This action oscillatingly alters the optical path length in that fiber to thereby modulate the phase of any electromagnetic waves passing therethrough.

Alternatively, phase modulator 19 may be an integrated optics chip having a substrate formed of, typically, lithium niobate ($LiNbO_3$) with an in-diffused titanium or proton exchange waveguide. Modulation generator 20 is electrically interconnected thereto by electrical leads connected to a pair of electrodes on either side of the waveguide causing phase modulation therein through the electrooptic effect. The phase of any electromagnetic waves traveling along the waveguide is varied as the electric field applied by the electrodes in response to the output signal of generator 20 applied to these electrodes electrooptically changing the effective index of refraction in the waveguide portion therebetween to thus modulate those waves. Electrical component behavior by the integrated optics chip is also exhibited at these electrodes on the chip substrate which again can be simulated at least in part by equivalent electrical components, again primarily capacitance.

Application of output voltage $V_{20}$ of modulation generator 20 to either of such devices chosen for use in the fiber optic gyroscope thus leads to a time varying phase change, $\phi(t)$ in electromagnetic waves passing through the optical path portion in that device. Not only is the second harmonic component in the output signal of modulation generator 20 carried through the phase modulator device chosen to be reflected in the time varying phase change in the gyroscope system optical path, but also the application of the necessary relatively large voltage amplitude of the fundamental component of this generator output signal to such a device leads to a mechanical response therefrom which typically provides a further second harmonic component to that time varying phase change. Thus, the bias modulation system induced time varying phase change experienced by the electromagnetic waves passing along the optical path of the phase modulator device used will be:

$$\phi(t) = C_{2\phi1}\cos\omega_g t + C_{2\phi2\delta_e}\cos(2\phi_g t + \Psi_e) + C_{2\phi1\delta_m}\cos(2\omega_g t + \Psi_m)$$

In this resulting phase response, the amplitude response of phase modulator 19 in converting to the first harmonic phase change component in the optical path portion of that modulator the effects of the first harmonic component of the output signal of modulation generator 20 applied to that modulator is $\phi_1$ involving both electromechanical and mechanooptic actions. A time varying phase second harmonic component occurs due to the linear amplitude response of modulator 19 to the second harmonic component of the output signal of modulation generator 20 as the result of converting the effects of its application to phase changes in the optical path portion of that modulator, this response being designated $\phi_2$ again involving both electromechanical and mechanooptic actions.

Another time varying phase second harmonic component also occurs due to the nonlinear amplitude response of modulator 19 to the first harmonic component of the output signal of modulation generator 20 as a result of converting the effects of its application to phase changes in the optical path portion of that modulator, the magnitude of that response relative to the response of converting the generator first harmonic component to a time varying first harmonic component be designated $\delta_m$. The phase of this time varying second harmonic component arising because of mechanical nonlinearities relative to the time varying first harmonic component is $\Psi_m$. Note that phase $\Psi_e$ in the will differ from phase $\Psi'_e$ in the second harmonic component of the output signal of modulation generator 20 as there may be some phase shift between the electrical stimulus of, and the mechanical response of, phase modulator 19 at the second harmonic frequency. The mechanical nonlinearities giving rise to the corresponding time varying second harmonic optical path phase change component typically come about because of nonlinear behavior in the structural materials of phase modulator 19, and because of hysteresis in materials and structural component relationships, for example mechanical coupling, in phase modulator 19.

The net non-reciprocal phase difference, $\phi_m(t)$, between counter propagating electromagnetic waves which have recombined in coupler 17 after passing through coil 10 and phase modulator 19 is $\phi(t) - \phi(t-\tau)$ in which $\tau$ is the time duration for an electromagnetic wave to leave modulator 19, travel through coil 10 and reach a symmetric point on the opposite side of that coil. This definition for $\phi_m(t)$ can be symmetrized by substituting for t on the basis of $t\underline{\Delta} t' + \tau/2$ thereby permitting more convenient manipulation of the equation for this quantity. The time duration $\tau$ is the propagation time through coil 10 for electromagnetic waves from phase modulator 19 to a symmetrical point on the other side of coil 10. Using the definition of $\phi_m(t)$, and making the foregoing substitution, gives the result:

$$\phi_m(t) = \phi(t) - \phi(t-\tau) = \phi\left(t' + \frac{\tau}{2}\right) - \phi\left(t' - \frac{\tau}{2}\right),$$

for $t\underline{\Delta} t' + \frac{\tau}{2}$ $$= C_{2\phi1}\left[\cos\left(\omega_g t' + \omega_g\frac{\tau}{2}\right) - \cos\left(\omega_g t' - \omega_g\frac{\tau}{2}\right)\right] +$$

$$C_{2\phi2\delta_e}[\cos(2\omega_g t' + \omega_g\tau + \psi_e) -$$

$$\cos(2\omega_g t' - \omega_g\tau + \psi_e)] +$$

$$C_{2\phi1\delta_m}[\cos(2\omega_g t' + \omega_g\tau + \psi_m) -$$

$$\cos(2\omega_g t' - \omega_g\tau + \psi_m)]$$

$$= -2C_{2\phi1}\sin\left(\omega_g\frac{\tau}{2}\right)\sin\omega_g t' -$$

$$2C_{2\phi2\delta_e}\sin(\omega_g\tau)\sin(2\omega_g t' + \psi_e) -$$

$$2C_{2\phi1\delta_m}\sin(\omega_g\tau)\sin(2\omega_g t' + \psi_m)$$

where the last equation has been obtained using trigonometric identities. If the amplitude of the fundamental harmonic term is defined as the modulation amplitude $\phi_m$, or $\phi_m \underline{\Delta} -2C_{2\phi1}\sin\omega_g\tau/2$, this last equation can be rewritten as:

$$\phi_m(t') = \phi_m\sin\omega_g t' + 2\frac{\phi_2}{\phi_1}\delta_e\phi_m\cos\left(\omega_g\frac{\tau}{2}\right)\sin(2\omega_g t' + \psi_e) +$$

$$2\delta_m\phi_m\cos\left(\omega_g\frac{\tau}{2}\right)\sin(2\omega_g t' + \psi_m)$$

The electromagnetic waves with this phase reach photodetector 13, and so the equation above for $i_{PD13}$ must be rewritten to use this last phase difference, or:

$$i_{PD13} = \frac{I_0}{2}\{1 + \cos[\phi_R + \phi_m(t')]\}$$

-continued $$= \frac{I_o}{2}\left\{\left(1 + \cos\left\{\phi_R + \phi_m\sin\omega_g t' + 2\phi_m\cos\left(\omega_g\frac{\tau}{2}\right)\left[\delta_m\sin(2\omega_g t' + \psi_m) + \frac{\phi_2}{\phi_1}\delta_e\sin(2\omega_g t' + \psi_e)\right]\right\}\right)\right\}$$

$$\approx \frac{I_o}{2}\left\{1 + \cos(\phi_R + \phi_m\sin\omega_g t') - 2\phi_m\cos\left(\omega_g\frac{\tau}{2}\right)\left[\delta_m\sin(2\omega_g t' + \psi_m) + \frac{\phi_2}{\phi_1}\delta_e(2\omega_g t' + \psi_e)\right] \times \sin(\phi_R + \phi_m\sin\omega_g t')\right\}$$

using trigonometric identities to reach this approximation.

The foregoing equation can be expanded in the Bessel series expansion which, combined with trigonometric identities, yields the first harmonic component appearing in the output of photodetector 13 as:

$$i_{PD13}|_{\omega_g} =$$

$$\frac{I_o}{2}\left\{\left(-2\sin\phi_R J_1(\phi_m)\sin\omega_g t' + 2\phi_m\cos\left(\omega_g\frac{\tau}{2}\right)\cos\phi_R \times\right.\right.$$

$$\left\{[J_1(\phi_m) - J_3(\phi_m)]\left[\frac{\phi_2}{\phi_1}\delta_e\sin\psi_e + \delta_m\sin\psi_m\right]\sin\omega_g t' - \right.$$

$$\left.\left.[J_1(\phi_m) + J_3(\phi_m)]\left[\frac{\phi_2}{\phi_1}\delta_e\cos\psi_e + \delta_m\cos\psi_m\right]\cos\omega_g t'\right)\right\}$$

Since the first harmonic signal from modulation generator 20 follows cosine $\omega_g t$, the in-phase component of the last equation will be extracted by phase sensitive detector 23 (the terms multiplied by sine $\omega_g t'$) at the fundamental frequency of modulation generator 20 as:

$$V_{23-out} =$$

$$k'\phi_m\cos\left(\omega_g\frac{\tau}{2}\right)[J_1(\phi_m) - J_3(\phi_m)]\left[\frac{\phi_2}{\phi_1}\delta_e\sin\psi_e + \delta_m\sin\psi_m\right]$$

assuming $\phi_R = 0$, i.e. ignoring any rotation of coil 10 to permit any phase difference at a zero rotation rate to be evaluated as error. The constant k' is again the constant appearing in the first equation for $V_{23-out}$ given above covering gain constants in system components ahead of, and in, phase sensitive detector 23.

Thus, as the equation for the extracted in-phase signal component shows, there is an offset value in the output signal of phase sensitive detector 23, that is, there is an output value present indicating a rotation rate of coil 10 despite the absence of any input rotation rate to that coil. However, the subsequent signal processing circuitry to which the gyroscope is connected will be designed to receive a signal $V_{23-out}$ in the expected form given in the first equation therefor above on the basis of no second harmonic distortion being present, or:

$$V_{23-out} = k'J_1(\phi_m)\sin\tilde{\phi}_R$$

defining any value out of phase sensitive detector 23 as being equivalently based on a rotation rate of $\tilde{\phi}_R$, a rotation rate error. Thus, equating these last two equations gives the value of $\tilde{\phi}_R$ which will be acquired by the subsequent signal processing circuitry and passed on as a valid rotation rate, this value being:

$$k'J_1(\phi_m)\sin\tilde{\phi}_R =$$

$$k'\phi_m\cos\left(\omega_g\frac{\tau}{2}\right)[J_1(\phi_m) - J_3(\phi_m)]\left[\frac{\phi_w}{\phi_1}\delta_e\sin\psi_e + \delta_m\sin\psi_m\right]$$

$$\sin\tilde{\phi}_R =$$

$$\phi_m\cos\left(\omega_g\frac{\tau}{2}\right)\left[\frac{J_1(\phi_m) - J_3(\phi_m)}{J_1(\phi_m)}\right]\left[\frac{\phi_2}{\phi_1}\delta_e\sin\psi_e + \delta_m\sin\psi_m\right]$$

This result can be simplified on the assumption that the rotation rate error $\tilde{\phi}_R$ will somehow be kept relatively small to have a useful gyroscope, the offset rotation rate error then directly being:

$$\tilde{\phi}_R =$$

$$\phi_m\cos\left(\omega_g\frac{\tau}{2}\right)\left[1 - \frac{J_3(\phi_m)}{J_1(\phi_m)}\right]\left[\frac{\phi_2}{\phi_1}\delta_e\sin\psi_e + \delta_m\sin\psi_m\right]$$

Consider an open loop interferometric fiber optic gyroscope using a phase modulator based on a ceramic body with optical fiber wrapped therearound and using fused couplers, an arrangement which will permit providing a fiber optic gyroscope of relatively modest performance having an output error of a few degrees per hours. Such a design will also limit the bias modulation frequency, or the frequency of the fundamental component of the output signal of modulation generator 20, to being intense of kilohertz.

In these circumstances, the first three factors on the right hand side of the last equation for the effective offset error $\tilde{\phi}_R$ will together yield a value on the order of one, if the typical value for the amplitude of the fundamental bias modulation component $\phi_m$ is chosen as 1.84 to maximize the expected output signal, so that the equation may be closely approximated as:

$$\tilde{\phi}_R \approx \frac{\phi_2}{\phi_1}\delta_e\sin\psi_e + \delta_m\sin\psi_m$$

In view of a typical permitted error for such a device of a few degrees per hour, $\tilde{\phi}_R$ would be typically specified as: $\tilde{\phi}_R \leq 10^{-6}$, or $$10^{-6} \geq \frac{\phi_2}{\phi_1}\delta_e\sin\psi_e + \delta_m\sin\psi_m$$

Clearly, each of the terms on the right of this inequality must at least satisfy the inequality individually if the inequality is to be satisfied, or $$\frac{\phi_2}{\phi_1} \delta_e \sin\psi_e \leq 10^{-6}, \delta_m \sin\psi_m \leq 10^{-6}.$$

A phase modulator formed of a ceramic ring with optical fiber wrapped thereabout is typically found to have the response in the time varying phase change provided in the optical path portion therethrough occurring at the second harmonic frequency be only a tenth of that occurring at the fundamental frequency so $\phi_2/\phi_1 \sim 0.1$. The factor $\sin\Psi_e$ can never be more than one, and $\Psi_e$ is subject to unpredictable variation preventing any assumption that it will continually be at any value less than one. Thus, the value $\sin\Psi_e$ must be treated as approximately one for purposes of an error analysis giving the result that $\Delta_e \leq 10^{-5}$.

Since $\Delta_e$ is the amplitude of the second harmonic component of the output signal provided by modulation generator 20 relative to the amplitude of the first harmonic component, the second harmonic component amplitude must be 100 dB less than the amplitude of the fundamental component. That is, the mechanical response of the phase modulator provides sufficient aid in suppressing the effect of the second harmonic component generated by modulation generator 20 so as to reduce the specification on that generator by a factor of 20 dB from the specification on the system output error.

On the other hand, $\sin\Psi_m$ again must be considered to be approximately one because of its unpredictability, the result is that $\delta_m \leq 10^{-6}$. Thus, as $\delta_m$ is the amplitude of the time varying second harmonic optical path phase change component due to the nonlinear mechanical response of phase modulator 19 relative to the time varying first harmonic optical path phase change component, the mechanically induced second harmonic phase change component amplitude must be 120 dB less than the fundamental time varying harmonic optical path phase change component amplitude.

The requirement on the output signal of modulation generator 20, $\delta_e \leq 10^{-5}$ or $-100$ dB, can be met by providing the output signal of generator 20 after having passed through a filter therein having a sufficient number of poles so as to give an attenuation of at least 100 dB at a frequency twice the fundamental frequency of the generator output signal, $\omega_g$. Such a filter must also be constructed of components which do not exhibit nonlinear behavior over the range of voltage amplitude required to be delivered by that generator to operate phase modulator 19. Such an arrangement will yield an output signal from generator 20 having the ratio of the amplitude of its second harmonic component relative to its fundamental component that is less than the phase error permitted in the rotation rate for the fiber optic gyroscope system of FIG. 1.

The mechanical requirement of $\delta_m \leq 10^{-6}$, or $-120$ dB, for phase modulator 19 can be far more difficult to meet using a structure having a ceramic ring with optical fiber wrapped several times therearound. Although the isolated ceramic body ring has well-suited oscillatory modes for periodic motion of that ring in that the mode at the fundamental component frequency $\omega_g$ is oscillatory radial motion of the ring outer surface back and forth, and its closest mode at $2\omega_g$ follows something of a FIG. 8 pattern such that there is no change in the outer surface perimeter due to that motion, significant further problems arise. Any constraints on the moving ring can lead to slight deformations therein giving rise to other harmonic components in the motion which are transferred into the stretching motion of the optical fiber wrapped therearound. The effects resulting from such changes in the fiber length dimension lead to second harmonic components in the optical path phase changes and induce second harmonic components in the electromagnetic waves passing therethrough.

One such constraint is the electrical signal interconnecting wires fastened to the ring which cause a mechanical load on that ring, and more specifically an unbalanced mechanical load. A typically much more serious source of unbalanced constraints is the load imparted to such a ring by many kinds of mounts which could potentially be used to secure that ring to a desired location. Finally, the wrapping of the optical fiber about the ring can be both a load constraint, specifically a non-uniform load constraint, and a source of substantial hysteresis and/or time varying mechanical unbalances due to the process of stretching of the fiber by the radially oscillating ring and the shifts that occur as the result of temperature cycling and aging. Inconsistencies in the ceramic material in the body of the ring can also cause such hysteresis and/or other deleterious effects. These various nonlinearities contribute to forming the value of $\delta_m$, and more specifically the second harmonic, and the hysteresis in particular contributes to the forming the value $\Psi_m$.

Figure 2A:
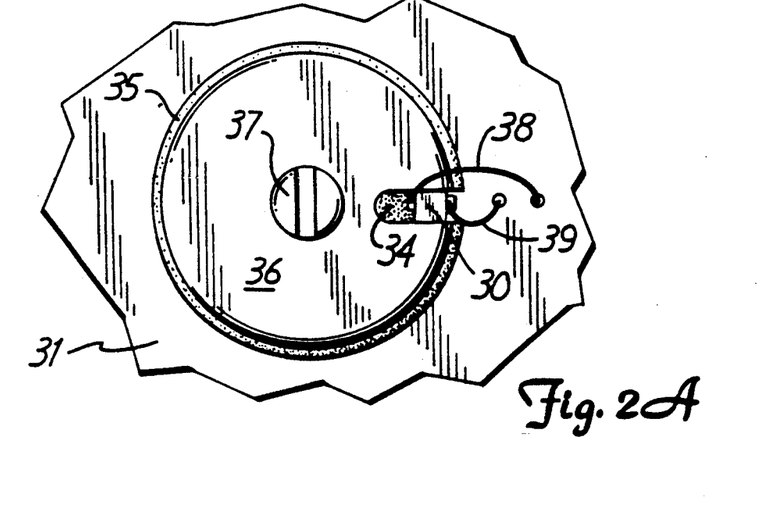
FIGS. 2A and 2B show a modulator system of the present invention.
Figure 2B:
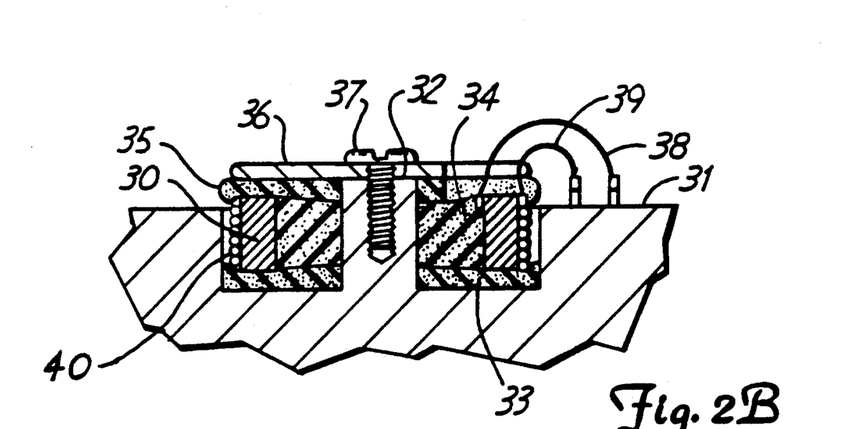

FIGS. 2A and 2B show a top view, and a side view in cross section, respectively, of an optical phase modulator constructed to substantially reduce these sorts of nonlinearities including the hysteresis and/or mechanical unbalances. A PZT ceramic ring, 30, is shown positioned in a recessed portion of a housing, 31, with the recessed portion being in the form of a flat bottom hole in this housing through its upper surface. This hole is enclosed by an outer vertical side surface formed by housing 31 having a circular cross section, there being a central core, 32, in the hole in the form of a right cylinder about which the hole is formed having an upper face substantially parallel to, and at a height above, the upper surface of housing 31.

A lower open cell, soft foam material layer, 33, is provided on the exposed bottom surface of this hole with a central hole therein allowing core 32 to extend up therethrough. Ceramic material ring 30 is positioned thereover and around core 32, ring 30 being kept approximately centered with respect to this core by a further open cell, soft foam material layer, 34, in the form of a round disk which is as thick as ring 30 is high. A central hole in foam disk 34 permits core 32 to also extend therethrough.

An upper open cell, soft foam material layer, 35, is positioned over layer 34 and much of the upper surface of ring 30, and around core 32 extending through a hole therein. A clamping plate, 36, with a fastener hole in the center, is positioned over much of ring 30 and layer 35, and all of core 32 except for the portion of that core exposed by the fastener hole. A screw, 37, goes through the fastener hole in clamping plate 36 and into a tapped hole in core 32 centered in its upper face.

Screw 37 is turned in until clamping plate 36 is forced tightly against the upper surface core 32. This action provides a fairly repeatable downward force on the combination of ring 30 between open cell, soft foam material layers 35 and 33 determined by the height of that ring and the thickness of those layers given a repeatable depth for the hole in housing 31 and a repeatable height for core 32. Thus, the forces by which ring 30 is held are reasonably well known from unit to unit and reasonably repeatable.

Layers 35 and 33 behave somewhat as nonlinear springs in that ring 30 is rather lightly held by them with very little stiffness in these layers in opposing forces of the ring applied to them if the ring is near to being centered therebetween. However, the opposition of these layers to ring forces applied to them increases very quickly if ring 30 is forced a significant distance in the direction of either of those layers, as by mechanical shock, i.e. the layers become relatively very stiff. Centering layer 34 behaves in a similar manner if part of ring 30 is moved radially toward core 32. This relatively light loading on ring 30 keeps the generation of second harmonic motion components during periodic motion of the ring forced by generator 20 very small, but nevertheless leaves ring 30 well restrained from relatively large motion excursions.

A pair of flexible wires, 38 and 39, are used to electrically contact the inner and outer curved surfaces of ring 30, respectively. Interconnection wires 38 and 39 are very flexible and so provide a very small mechanical loading on ring 30. A possible alternative to a ring, which would aid in avoiding loading of interconnection wires 38 and 39, would be use a solid disk of ceramic material rather than a ring as such disks under periodic motion develop stationary node locations thereon at which such wires could be affixed to not impede disk motion.

A portion, 40, of the optical fiber extending between coupler 17 and coil 10 which is wrapped around ring 30 is shown in FIGS. 2A and 2B to be wrapped around the central portions of the curved outer surface of ring 30. Flexible wire 39 is connected to the curved outer surface of ring 30 above the portion of that surface about which optical fiber portion 40 is wrapped. Substantially reducing hysteresis and slippage in the stretching process undergone by the wrapped optical fiber during modulation requires that the jacket on optical fiber portion 40 be thin and hard, and adhere well to the silica core.

Also for this purpose, optical fiber portion 40 is wrapped under tension of about 40 grams about the outer curved surface of ring 30, and is done with that surface wet with ultraviolet curable epoxy which suffuses through the wrapped fiber portion and is thereafter cured to firmly bond that portion to the outer curved surface of ring 30. Optical fiber portion 40 is wrapped symmetrically about the outer surface of ring 30 with an integral number of turns to avoid any stretching of just a portion of a loop in that fiber therearound.

Such a structure for phase modulator 19 can result in a phase modulator in which the mechanical response generated second harmonic component that relatively easily achieves having mechanically induced time varying second harmonic optical path phase changes of amplitudes that are 80 dB less than the fundamental frequency component amplitudes and, with care, will have an amplitude more than 120 dB below that of the fundamental component. Thus, the phase modulator of FIGS. 2A and 2B can meet the requirement of providing a second harmonic phase change component which is no more than that permitted for the offset phase error component in the output signal of the fiber optic gyroscope system of FIG. 1.

The expression found above for the offset phase error due to the presence of second harmonic components shows two further possibilities for reducing or eliminating such an offset error. The first is found in the factor $[1-J_3(\phi_m)/J_1(\phi_m)]$ which can be forced to zero, or very close to zero, by choosing the amplitude of the fundamental component of the phase change $\phi_m$ at a substantially higher value, 3.05, than the value used to maximize the expected output signal, 1.84. This would result in a $\tilde{\phi}_R$ also becoming zero. A system for selecting and maintaining amplitude values of the bias modulation fundamental component is described in earlier filed co-pending United States application entitled "Fiber Optic Gyroscope Bias Modulation Amplitude Determination" by P. Dane et al having Ser. No. 07/636,305, issued Mar. 23, 1993 as U.S. Pat. No. 5,196,904, and assigned to the same assignee as the present application, which is hereby incorporated herein by reference. Although such an arrangement cannot keep the bias modulation amplitude perfectly at 3.05, and offsets due to larger quadrature signals increase, this arrangement can be used to provide a relatively small value for this factor, even if not zero, which can in turn increase the limits which $\delta_e$ and $\delta_m$ must meet even though the fiber optic gyroscope output signal offset phase error specification remains unchanged.

The other remaining possibility for eliminating or significantly reducing the offset phase error shown in the equation found therefor is provided by the factor $\cos\omega_g\tau/2$. As is well known, there is a so-called "proper frequency" for $\omega_g$ in operating phase modulator 19 by modulation generator 20. At that modulation frequency, the modulation of the counter-propagating electromagnetic waves in coil 10 will be 180° out of phase which provides various benefits in the operation of a bias modulation system. The proper frequency for $\omega_g$, or $\omega_{g-p}$, is $\omega_{g-p}\tau=\pi$. At that frequency, clearly $\omega_g/2=\pi/2$. Since $\cos\tau/2=0$, $\tilde{\phi}_R$ also becomes zero. A phase modulator of the type described in FIGS. 2A and 2B usually cannot operate at the typical frequency this implies for relatively short lengths of optical fiber being used to form coil 10 (although it is suitable for longer lengths), and so one option is to use an integrated optics chip phase modulator particularly if a coiled loop fiber optic gyroscope is involved.

If the typical value for $\phi_m$ of 1.84 is again used, $\phi_m[1-J_3(\phi_m)/J_1(\phi_m)]$ will be approximately one again. On the other hand, the use of an integrated optics chip will eliminate help from the mechanical response ratio, i.e. $\phi_2/\phi_1$ will be approximately one since an integrated optics chip exhibits a wide bandwidth in use of the electrooptic effect which introduces no significant frequency dependent effects until the capacitance between the electrodes becomes significant at very high frequencies. As a result, the aid this factor brought in raising the limit to be met by $\delta_e$ is eliminated. Further, $\delta_m$ will be approximately zero so there will not be a mechanically induced second harmonic component difficulty in using an integrated optics chip of any significance, this result coming about because the elastooptic effect in the material body in such a chip is insignificant compared to the electrooptic effect. Such integrated optics chips exhibit other nonlinearities which result only in quadrature effects. In these circumstances, from the result found for $\tilde{\phi}_R$ above, and again noting that $\sin\Psi_e$ must be considered a value of one, the error phase can be written:

$$|\bar{\phi}_R|_{max} = \cos\left(\omega_g \frac{\tau}{2}\right)\delta_e$$

However, there are substantial difficulties in attempting to set $\cos\omega_g\tau/2$ to zero, or $\omega_g/2$ to $\tau/2$, because $\tau$ is a function of temperature due to the optical fiber in coil 10 expanding and contracting with temperature changes. Typically, this temperature dependence is on the order of:

$$\frac{1}{\tau}\frac{d\tau}{dT} \approx 10^{-5}/°C.$$

where T represents temperature on the Centrigade scale. This temperature dependence leads to a corresponding temperature dependence in $\cos\omega_g\tau/2$ which for $\omega_g\tau/2$ being approximately $\pi/2$ can be shown to be approximately:

$$\frac{d\cos\left(\omega_g\frac{\tau}{2}\right)}{dT} \approx -\frac{\pi}{2}10^{-5}/°C.$$

Thus, for a maximum excursion of 60° C. from room temperature, $\cos\phi_g\tau/2$ will change by as much as:

$$\left|\Delta\cos\left(\omega_g 1\frac{\tau}{2}\right)\right| = 60\frac{\pi}{2}10^{-5} \approx 10^{-3}$$

Thus, $|\cos\omega_g\tau/2|$ cannot be expected to remain any closer than within $10^{-3}$ of zero, and so:

$$\delta_e \leq \frac{|\bar{\phi}_R|_{max}}{10^{-3}}.$$

Hence, the requirement on the relative amplitude of the second harmonic component with respect to the first harmonic component from modulation generator 20 is less stringent in the situation which phase modulator 19 is operated at the proper frequency by 60 dB. This can be achieved by use of an integrated optic circuit rather than by a ceramic body having optical fiber wrapped therearound or a long length of optical fiber in coil 10 using such a ceramic body and wrap. On the other hand, the expense of using an integrated optic chip, or a long length of coil, or both, often will mean that a high quality fiber optic gyroscope must be provided to make it saleable at the necessary price. Thus, $|\bar{\phi}_R|_{max}$ may be significantly decreased, such as to being less than $10^{-8}$, or only a fraction of a degree per hour. In the situation of an integrated optics chip, the requirement on the amplitude of the second harmonic component relative to the first harmonic component provided by modulation generator 20, $\delta_e$, may be as stringent as it was in the previous situation of $|\phi_R|_{max}$ being less than $10^{-5}$.

In many situations, modulation generator 20 will be desired for convenience to provide a square wave to operate phase modulator 19 rather than a sinusoid. For instance, this waveform may be quite convenient in certain demodulation schemes differing from the one shown in the system of FIG. 1. Such square waves, if truly square, do not contain even harmonics, and so the only harmonic likely to be significant, the second harmonic, in operating phase modulator 19 would not be present.

However, providing a square wave to drive a substantially capacitive load may be quite difficult, particularly at higher frequencies. A duty cycle other than a 50% duty cycle is not a major difficulty, as such an asymmetrical rectangular wave merely raises the quadrature signal provided by the phase detector. On the other hand, if the rise times and fall times of the rectangular wave or the square wave are unequal, second harmonic components will be generated leading to an offset phase error. The limit on the resulting second harmonic component from generator 20 relative to the fundamental component therefrom, $\delta_e$, would remain related to the permitted fiber optic gyroscope phase error limit as shown in the equations therefor above, and can be shown to be related to rise and fall time differences approximately as:

$$\delta_e \approx \frac{\text{RISE TIME} - \text{FALL TIME}}{\tau}$$

If coil 10 is chosen to be 1.0 km in length, $\tau$ will be approximately 5 $\mu$s. If $\delta_e$ again must meet the requirement $\delta_e \leq 10^{-5}$, then the difference between the wave rise time and the fall time must not exceed 0.05 ns.

Although the present invention has been described with reference to preferred embodiments, workers skilled in the art will recognize that changes may be made in form and detail without departing from the spirit and scope of the invention.

What is claimed is:

1. A rotation sensor capable of sensing rotation about an axis of a coiled optical fiber, said sensing based on electromagnetic waves propagating in opposite directions in said coiled optical fiber to impinge on a photodetector with a phase relationship which has an effective maximum offset error associated with a specified maximum rotation rate offset error, said rotation sensing comprising:

a bias optical phase modulator means having an input and being positioned in an optical path portion selected from among those optical path portions taken by electromagnetic waves to reach or leave said coiled optical fiber en route on an optical path to said photodetector, said bias optical phase modulator means for phase modulating any such electromagnetic waves passing therethrough and propagating along said optical path so as to provide a varying phase difference between such electromagnetic waves propagating through said coiled optical fiber in opposing directions in response to a corresponding electrical signal on said input thereof which, if substantially periodic at a selected fundamental frequency, causes said varying phase at a frequency twice that of said fundamental frequency to have an amplitude that is first fraction of that amplitude that said varying phase has at said fundamental frequency.

a phase modulation generator means having an output electrically connected to said bias optical phase modulator means input, said phase modulation generator means for providing a substantially periodic electrical output signal at said output thereof having a fundamental component at said selected fundamental frequency and a selected amplitude, and having a harmonic component at a frequency twice that of said fundamental frequency with an amplitude that is a second fraction of said fundamental component amplitude; and a signal component selection means having a detection input, electrically connected to said photodetector to receive an output therefrom representative of any phase differences occurring between pairs of electromagnetic waves impinging thereon, and having an output, said signal component selection means for causing signals to appear at said output thereof based on said fundamental frequency, said bias optical phase modulator means providing a varying phase difference at said fundamental frequency between electromagnetic waves propagating through said coiled optical fiber in opposing directions of a fundamental phase difference amplitude in response to said phase modulation generator means providing said phase modulation generator means output signal at said output thereof, said phase modulation generator means including means for controlling said second fraction such that said second fraction is of a value less than a ratio of said effective maximum offset error to said fundamental phase difference amplitude, said bias optical phase modulator for controlling said first fraction such that said first fraction is of a value less than a ratio of said effective maximum offset error to said fundamental phase difference amplitude.

2. The apparatus of claim 1, wherein said control means of said phase modulating generator means through which said phase modulation generator means output signal is provided, includes filter means for reducing amplitudes of signal components provided therethrough at twice said fundamental frequency by a selected attenuation factor below amplitudes of signal components provided therethrough at said fundamental frequency to achieve said value for said second fraction.

3. The apparatus of claim 1 wherein said bias optical phase modulator includes a piezoelectric material structure having an input and having a surface of revolution with a perimeter which can vary in extent in response to an electrical signal provided to said input, a length of optical fiber insertable in said optical path and forming a coil wrapped about said surface of revolution, a pair of interface layers which are compressible but with nonlinear stiffness in resisting compression such that resistance to compression increases substantially with sufficient increases in compression, and clamping means or mounting said piezoelectric material structure between said pair of interface layers.

4. The apparatus of claim 1 wherein said phase modulation generator means output signal approximates a rectangular waveform, and said second fraction is approximately equal to that difference occurring between said rise times and said fall times therein divided by that time duration required for electromagnetic waves to propagate from said optical phase modulator means through said coiled fiber to a symmetric point in an optical path therebetween on an opposite side of said coiled fiber.

5. The apparatus of claim 1 wherein said signal component selection means has a demodulation input electrically connected to said phase modulation generator means output to receive said output signal therefrom, said signal component selection means for using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

6. The apparatus of claim 3 wherein said length of optical fiber has a thin, adherent jacket thereabout.

7. The apparatus of claim 3 wherein said length of optical fiber is bonded both to itself and to said piezoelectric material structure.

8. The apparatus of claim 3 wherein said phase modulation generator means output is electrically connected to said bias optical phase modulator means input with an interconnection hat is a flexible wire in a portion close to that said input.

9. The apparatus of claim 7 wherein said length of optical fiber is bonded by wrapping it about said piezoelectric material structure with an uncured bonding agent thereon which is cured after such wrapping.

10. The apparatus of claim 7 wherein said length of optical fiber has substantially an integral number of turns about said piezoelectric material structure in being wrapped therearound.

11. A rotation sensor capable of sensing rotation about an axis of a coiled optical fiber, said sensing based on electromagnetic waves propagating in opposite directions in said coiled optical fiber to impinge on a photodetector with a phase relationship which has an effective maximum offset error associated with a specified maximum rotation rate offset error, said rotation sensor comprising:

a bias optical phase modulator means having an input and being positioned in an optical path portions selected from among those optical path portions taken by electromagnetic waves to reach or leave said coiled optical fiber en route on an optical path to said photodetector, said bias optical phase modulator means for phase modulating any such electromagnetic waves passing therethrough and propagating along said optical path so as to provide a varying phase difference between such electromagnetic waves propagating through said coiled optical fiber in opposing directions in response to a corresponding electrical signal on said input thereof which, if substantially periodic at a selected fundamental frequency, causes said varying phase at a frequency twice that of said fundamental frequency to have an amplitude that is a first fraction of that amplitude that said varying phase has at said fundamental frequency;

a phase modulation generator means having an output electrically connected to said bias optical phase modulator means input, said phase modulation generator means for providing a substantially periodic electrical output signal at said output thereof having a fundamental component at said selected fundamental frequency and a selected amplitude, and having a harmonic component at a frequency twice that of said fundamental frequency with an amplitude that is a second fraction of said fundamental component amplitude; and a signal component selection means having a detection input, electrically connected to said photodetector to receive an output therefrom representative of any phase differences occurring between pairs of electromagnetic waves impinging thereon, and having an output, said signal component selection means for causing signals to appear at said output thereof representing amplitudes of components of signals occurring at said detection input thereof based on said fundamental frequency, said bias optical phase modulator means providing a varying phase difference at said fundamental frequency between electromagnetic waves propagating through said coiled optical fiber in opposing directions of a fundamental phase difference amplitude in response to said phase modulation generator means providing said phase modulation generator means output signal at said output thereof, said bias optical phase modulator means and said phase modulation generator means having means for establishing parameter values therein so as to provide a weighting factor multiplying at least one of said first fraction and said second fraction to form a product therewith such that the remaining one of said first and second fractions and said product are both of values less than an output ratio of said effective maximum offset error to said fundamental phase difference amplitude with that one of said first and second fractions used in forming said product being greater than said output ratio.

12. The apparatus of claim 11 wherein both of said first and second fraction form corresponding first and second products through being multiplied by said weighting factor, and both of said first and second products are of values less than said output ratio, with both of said first and second fractions being greater than said output ratio.

13. The apparatus of claim 11 wherein said weighting factor is based on a response ratio, said bias optical phase modulator means providing a varying phase at said fundamental frequency in electromagnetic waves propagating through said coiled optical fiber of a fundamental phase amplitude in response to said phase modulation generator providing said phase modulation generator means output signal at said output thereof, and further providing a varying phase at a frequency twice that of said fundamental frequency in electromagnetic waves propagating through said coiled optical fiber of a harmonic phase amplitude in response to said phase modulation generator means providing a periodic signal at said output thereof at a frequency twice that of said fundamental frequency, said response ratio being equal to a ratio of said harmonic phase amplitude to said fundamental frequency amplitude.

14. The apparatus of claim 11 wherein said signal component selection means has a demodulation input electrically connected to said phase modulation generator means output to receive said output signal therefrom, said signal component selection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

15. The apparatus of claim 12 wherein said weighting factor is based on a sinusoid of $(\omega_g \tau/2)$ with $\omega_g$ being said fundamental frequency and kept within a selected range about $\pi/\tau$ over a selected temperature range with $\tau$ being that time duration required for electromagnetic waves to propagate from said optical phase modulator means through said coiled fiber to a symmetric point in an optical path therebetween on an opposite side of said coiled fiber.

16. The apparatus of claim 12 wherein said weighting factor is based on $[J_1(\phi)-J_3(\phi)]$ with $\phi$ being said fundamental phase difference amplitude and kept within a selected range about 3.05 over a selected temperature range.

17. The apparatus of claim 13 wherein said means for establishing of said bias optical phase modulator includes a piezoelectric material structure having an input and having a surface of revolution with a perimeter which can vary in extent in response to an electrical signal provided to said input, a length of optical fiber insertable in said optical path and forming a coil wrapped about said surface of revolution, a pair of interface layers which are compressible but with nonlinear stiffness in resisting compression such that resistance to compression increases substantially with sufficient increases in compression, and clamping means for mounting said piezoelectric material structure between said pair of interface layers.

18. The apparatus of claim 15 wherein said phase modulation generator means output signal approximates a rectangular waveform, and said second fraction is approximately equal to that difference occurring between said rise times and said fall times therein divided by that time duration required for electromagnetic waves to propagate from said optical phase modulator means through aid coiled fiber to a symmetric point in an optical path therebetween on an opposite side of said coiled fiber.

19. The apparatus of claim 17 wherein said length of optical fiber has a thin, adherent jacket thereabout.

20. The apparatus of claim 17 wherein said length of optical fiber is bonded both to itself and to said piezoelectric material structure.

21. The apparatus of claim 17 wherein said phase modulation generator means output is electrically connected to said bias optical phase modulator means input with an interconnection that is a flexible wire in a portion close to that said input.

22. The apparatus of claim 20 wherein said length of optical fiber is bonded by wrapping it about said piezoelectric material structure with an uncured bonding agent thereon which is cured after such wrapping.

23. The apparatus of claim 20 wherein said length of optical fiber has substantially an integral number of turns about said piezoelectric material structure in being wrapped therearound.

24. A bias optical phase modulator for positioning in an optical path and capable of phase modulating electromagnetic waves passing therethrough propagating along said optical path, said bias optical phase modulator comprising:

a piezoelectric material structure having an input and having a surface of revolution with a perimeter which can vary in extent in response to an electrical signal provided to said input;

a length of optical fiber insertable in said optical path and forming a coil wrapped about sad surface of revolution;

a pair of interface layers which are compressible but with nonlinear stiffness in resisting compression such that resistance to compression increases substantially with sufficient increases in compression; and clamping means for mounting said piezoelectric material structure between said pair of interface layers.

25. The apparatus of claim 24 wherein said pair of interface layers are each formed of a soft foam material.

26. The apparatus of claim 24 wherein said piezoelectric material structure is configured as a ring structure and further comprises a centering ring which is compressible but with nonlinear stiffness in resisting compression such that resistance to compression increases substantially with sufficient increases in compression, said centering ring being positioned inside said piezoelectric material ring structure about a rigid locating core.

27. The apparatus of claim 24 wherein said length of optical fiber has a thin, adherent jacket thereabout.

28. The apparatus of claim 24 wherein said length of optical fiber is bonded both to itself and to said piezoelectric material structure.

29. The apparatus of claim 24 wherein said phase modulation generator means output is electrically connected to said bias optical phase modulator means input with an interconnection that is a flexible wire in a portion close to that said input.

30. The apparatus of claim 25 wherein said foam is open cell foam.

31. The apparatus of claim 26 wherein said centering ring is formed of a soft foam material.

32. The apparatus of claim 28 wherein said length of optical fiber is bonded by wrapping it about said piezoelectric material structure with an uncured bonding agent thereon which is cured after such wrapping.

33. The apparatus of claim 28 wherein said length of fiber has substantially an integral number of turns about said piezoelectric material structure in being wrapped therearound.

34. The apparatus of claim 31 wherein said foam is open cell foam.

* * * * *

UNITED STATES PATENT AND TRADEMARK OFFICE
CERTIFICATE OF CORRECTION

PATENT NO. : 5,289,258
DATED : Feb. 22, 1994
INVENTOR(S) : Bogdan Szafraniec, Richard H. Frische, Richard J. August, Kevin B. Dimond, Dick Ang, James N. Blake, John R. Feth.

It is certified that error appears in the above-indentified patent and that said Letters Patent is hereby corrected as shown below:

Column 19, line 31, cancel "modulating" and substitute --modulation--.

Column 20, line 13, cancel "hat" and substitute --that--.

Column 20, line 32, cancel "portions" and substitute --portion--.

Column 21, line 24, cancel "fraction" and substitute --fractions--.

Column 22, line 27, cancel "aid" and substitute --said--.

Column 22, line 59, cancel "sad" and substitute --said--.

Column 24, line 13, before "fiber" insert --optical--.

Signed and Sealed this

Eighteenth Day of October, 1994

Attest:

BRUCE LEHMAN

Attesting Officer     Commissioner of Patents and Trademarks